United States Patent [19]

Chikazawa

[11] Patent Number: 5,109,804
[45] Date of Patent: May 5, 1992

[54] COATED ANIMAL LITTER

[76] Inventor: Osamu Chikazawa, 1-5-13, Nipponbashi, Chuo-Ku, Osaka-Shi, Japan, 540

[21] Appl. No.: 598,354

[22] Filed: Oct. 15, 1990

Related U.S. Application Data

[63] Continuation-in-part of Ser. No. 453,686, Dec. 20, 1989, abandoned.

[51] Int. Cl.$^5$ .............................................. A01K 29/00
[52] U.S. Cl. .................................................. 119/171
[58] Field of Search ........................ 119/171, 172, 173

[56] References Cited

U.S. PATENT DOCUMENTS 4,437,429  3/1984  Goldstein et al. .................. 119/173
4,925,826  5/1990  Hamm et al. ........................ 119/171

FOREIGN PATENT DOCUMENTS 1015233  8/1977  Canada ................................. 119/171
2627102  8/1989  France ................................. 119/172

Primary Examiner—John G. Weiss
Attorney, Agent, or Firm—Brumbaugh, Graves, Donohue & Raymond

[57] ABSTRACT

A litter material for receiving the excreta of pet animals which are fed at home is disclosed. In contrast to the conventional materials that are not disposable to a flush toilet with water, the inventive litter material is disposable to a flush toilet. The litter material of this invention is prepared from grains, including the steps of heat-cooking for expanding the beans in size and coating thereof with an inorganic material selected from the zeolite series.

5 Claims, 1 Drawing Sheet

COATED ANIMAL LITTER

CROSS-REFERENCE TO RELATED APPLICATION

This application is a continuation-in-part of applicant's co-pending application Ser. No. 07/453,686, filed Dec. 20, 1989, now abandoned.

BACKGROUND OF THE INVENTION

This invention relates to a litter material for receiving excreta of in-house pet animals. More particularly, this relates to an artificial litter or bedding material for avoiding the nuisance caused by the excrement of in-house pet animals.

Today, many kinds of pet animals are fed at home and, in the case of pets staying in the interior of the house, treatment of their excreta, both dung and urine has become a common problem. Conventionally, sand or paper clippings or wood chippings have been spotted at a place where a pet would excrete. Further artificial sands made of plastic granules have been proposed, and U.S. Pat. No. 4,444,149 has also proposed a watering device. However, such conventional materials are not allowed to be disposed into a flush toilet with water, because bacteria cultivated in the follower sanitary and/or sewage facilities can not digest such conventional materials, and these materials may cause blockings or pluggings in pipes. Therefore, pet feeders may take these materials to somewhere outdoors, which may cause a nuisance associated with bad odor given off from the excreta.

SUMMARY OF THE INVENTION

This invention offers a litter material for the use as noted which is disposable into a flush toilet. The process for manufacturing the inventive litter material starts from cereals or grain seeds: kaoliang, millet, wheat, rice etc. and in the following, the term "grains" represents them. Plant materials comprising starch, preferably in large quantities such as tapioca, sweet potato, white potato and the like may also be employed as a starting material in the manufacture of the litter material of this invention, and, as used in this description and in the appended claims, the term "grains" additionally includes starch-containing plant materials such as tapioca, sweet potato, white potato and the like. Such plant materials may be pretreated by addition of moisture, size reduction, heating, and combinations thereof prior to heating, decompression and coating; as further discussed hereinbelow.

Grains are first subjected to a heat cooking and burst treatment, which comprises placing some amount of the grains in a pressure vessel and heating under tight seal so that water contained in the grains reaches a superheated state, and then decompressing or releasing the pressure rapidly to burst each grain granule to expanded or exploded form, which is analogous to the process employed to make "popcorn" (commercial name). In this invention, a lower grade of grains, for instance, wheat of a grade which can not be applied to human service is allowed to be used.

Then, burst grains are subjected to a stabilization or powdering step after air cooling, which comprises sprinkling or coating the grains with an inorganic alumina-silicate complex, namely zeolite, of which the general expression is given as $MeO.Al_2O_3.SiO_2.H_2O)$, wherein Me is Na, K or Ca. Such an aftertreating material contributes to avoidance of the lumping tendency of the grains as well as of subsequent inconvenience in handling such highly bulky, fluffy granules, in addition to increasing the absorbence of water, which will mainly come from urine. Therein further, antiseptic or deodorant chemicals may be incorporated. Still further, some colorants may be optionally incorporated so that pets will avoid eating the burst grains, but such colorants should be selected from those which are harmless and approved as food additives, wherein yellow or light yellow is of use to improve the commercial merit.

Figure 1:
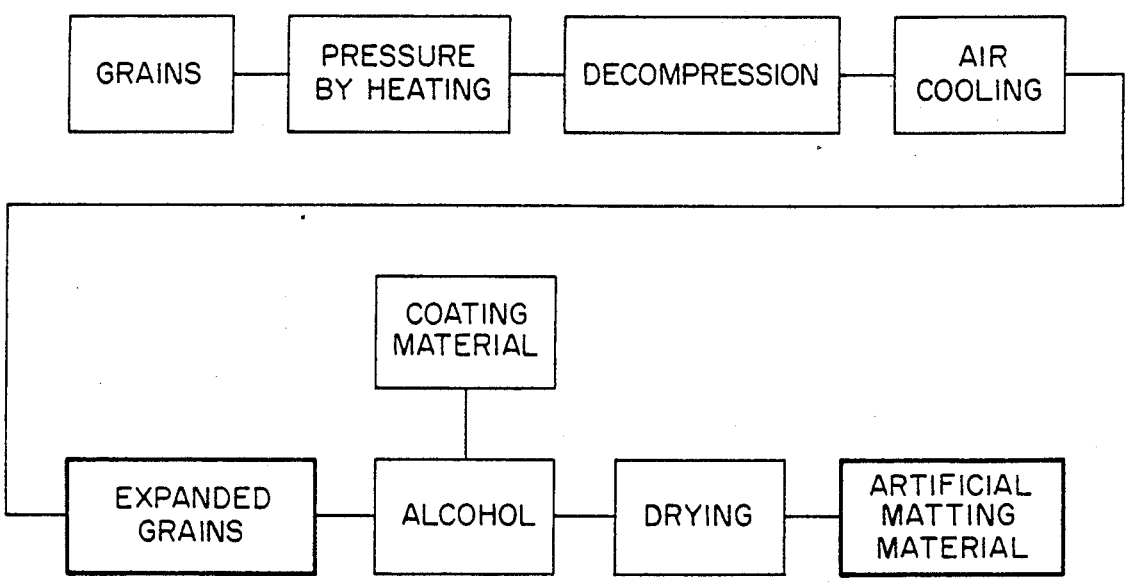
FIG. 1 is a schematic block diagram which shows a process for manufacturing the inventive litter materials.

This diagram is presented to illustrate the inventive process and therefore, this should not be construed as limiting the invention.

DESCRIPTION OF THE PREFERRED EMBODIMENTS

With reference to FIG. 1 grains are charged into a pressure vessel and cooked or heated to reach about 10 $kg/cm^2$ pressure, and then the vessel is decompressed and spontaneously the expansion of beans takes place, 5 to 10 times in volume. If the desired expansion does not take place, the maximum pressure before the decompression should be raised or extended timewise, or preliminary boiling of the beans with water at an atmospheric pressure is advisable.

In one preferred embodiment of this invention, plant materials comprising starch, preferably in large quantities are employed as starting materials in the manufacture of the litter material of this invention. Such plant materials are preferably selected from the group consisting of tapioca, sweet potato, white potato, and mixtures thereof. These plant materials may be pretreated by addition of moisture, size reduction, heating and combinations thereof prior to heating and decompression as set forth hereinabove. An example of the pretreatment steps which may be employed for a starch-containing plant material (i.e. tapioca) in accordance with this invention is set forth in Example 1 below.

EXAMPLE 1

Tapioca is pretreated as follows: the tapioca is dried and smashed, and water is added until the tapioca obtains a pasty consistency and is a tapioca paste. The tapioca paste is then passed through a fine sieve, and dropped on a heated steel board at a temperature of 120–150° C., which transforms the paste to a plurality of lumps having a rough diameter in the range of 1–2mm.

The tapioca lumps, pretreated as described hereinabove, are then heated and decompressed in accordance with this invention as follows: the tapioca lumps are charged into a pressure vessel and heated so that a pressure of about 10 $kg/cm^2$ is achieved. The vessel is then decompressed, and the expansion of the tapioca lumps in accordance with this invention thereupon takes place. The expanded tapioca material may be air-cooled and subjected to the above-described stabilization or powdering step in accordance with this invention.

A powdering solution is prepared by charging zeolite particles to an alcohol, methyl or ethyl alcohol being recommended for its easy evaporation. The solution or suspension is sprinkled over the expanded grains to coat them with the powder material, of which preferable range for the coating is 3 to 50 parts for 100 parts of the grains, dry basis. Below the range, the desired effect will be undesirably less and above the range, impaired water absorbence and undesirable cost will result.

Other ingredients such as antiseptics, preservatives, and coloring chemicals, are incorporated at this stage, the formulation range of which is normally 0.1 to 0.5 parts for 100 parts of the grains.

The inventive litter material is thus obtained by drying or removing the alcohol and then is put into use with the advantages of superior absorbence of water and of resistance to spreading or penetration to wider areas of contaminations caused by the excreta, and the powder material as noted has been proved to cause suitable cohesion of individual particles of the grains, which would be otherwise easily scatter from each other, in addition to the effect of increasing the absorbence of water or bad odor.

Further, the inventive liter material may be disposed of in a flush toilet with water, because the starting grains, in reference to backbone components chemically, are composed mainly of starch and cellulose which are converted to be the bacteria digestable state by the heat-cooking. Thus the inventive litter materials are permitted to be disposed of in a flush toilet, wherein the follower sanitary and/or sewage facilities will act on such comparably to the excreta with aid of microorganism.

Although the invention has been described in its preferred form, it is understood that the present invention should not be limited by any details of the preferred form without departing from the spirit and scope of the claims described hereinafter.

I claim:

1. A litter material for pet animals, comprising the steps of expanding grains by subjecting the grains to a heat-pressurized state and decompression, and coating the grains thus treated with an inorganic powder material of zeolite in a range of 3-50 parts thereof for 100 parts of the grains, wherein the grains are pretreated by the steps of:
   (a) drying and reducing in size;
   (b) adding water to the dried and size-reduced grains to obtain a paste; and
   (c) passing the paste through a fine sieve and heating the sieved paste at a temperature in the range of 120°-150° C. to transform the paste into a plurality of lumps having a diameter in the range of 1-2 millimeters.

2. A litter material according to claim 1, wherein the grains are selected from the group consisting of tapioca, sweet potato, white potato, and mixtures thereof.

3. A litter material according to claim 1, wherein additives selected from the group consisting of antiseptics, colorants, and mixtures thereof are incorporated.

4. A litter material according to claim 1, wherein the grains are pretreated prior to subjecting the grains to a heat-pressurized state and decompression by pretreatment steps selected from the group consisting of addition of moisture, size reduction, heating and combinations thereof.

5. A litter material according to claim 1, prepared by a method comprising the steps of:
   (a) drying and reducing tapioca in size;
   (b) adding water to the dried and size-reduced reduced tapioca to obtain a tapioca paste;
   (c) passing the tapioca paste through a fine sieve and heating the sieved paste at a temperature in the range of 120°-150° C. to transform the paste into a plurality of lumps having a diameter in the range of 1-2 millimeters;
   (d) charging the lumps into a pressure vessel and heating the vessel to achieve a pressure of about 10 $kg/cm^2$;
   (e) decompressing the vessel to obtain an expanded tapioca material; and
   (f) coating the expanded tapioca material with an inorganic powder material of zeolite.

* * * * *